United States Patent [19]

Di Benedetto et al.

[11] 4,348,505

[45] Sep. 7, 1982

[54] ADDUCTS FROM AMINES AND DI- AND POLYEPOXIDES

[75] Inventors: Marianne Di Benedetto, Pleasantville, N.Y.; John A. Gannon, Danbury, Conn.

[73] Assignee: Ciba-Geigy Corporation, Ardsley, N.Y.

[21] Appl. No.: 210,890

[22] Filed: Nov. 28, 1980

Related U.S. Application Data

[63] Continuation-in-part of Ser. No. 171,520, Jul. 23, 1980, abandoned.

[51] Int. Cl.³ .................... C08G 59/64; C08G 59/14
[52] U.S. Cl. ................................ 525/504; 252/182; 525/507; 544/397; 544/401; 564/325; 564/350
[58] Field of Search .................. 525/507, 504; 528/88, 528/99, 111; 544/397, 401; 564/325, 350; 252/182

[56] References Cited

U.S. PATENT DOCUMENTS

| | | | |
|---|---|---|---|
| 2,909,448 | 10/1959 | Schroeder | 528/111 X |
| 3,029,286 | 4/1962 | Bressler et al. | 528/111 X |
| 3,311,590 | 3/1967 | Weber et al. | 584/325 X |
| 3,538,184 | 11/1970 | Heer | 528/111 X |

FOREIGN PATENT DOCUMENTS

| | | |
|---|---|---|
| 691543 | 5/1953 | United Kingdom . |
| 832189 | 4/1960 | United Kingdom . |
| 1264887 | 2/1972 | United Kingdom . |

OTHER PUBLICATIONS

Lee and Neville, *Handbook of Epoxy Resins,* McGraw-Hill, New York, 1967, pp. 2-14, 2-15, 2-21 & 4-70.

*Primary Examiner*—Earl A. Nielson
*Attorney, Agent, or Firm*—Harry Falber

[57] ABSTRACT

A liquid adduct is prepared from the reaction of an amine, a polyepoxide compound with a functionality greater than 2, and, optionally, a diglycidyl ether of bisphenol A and/or the hydrogenated equivalent thereof, an accelerator or a suitable solvent; said reaction continuing until no active epoxy groups are available. The adducts are useful as curing agents for epoxy resins in both room temperature and heat cured applications to produce protective coatings of superior properties.

10 Claims, No Drawings

ADDUCTS FROM AMINES AND DI- AND POLYEPOXIDES

This is a continuation-in-part of application Ser. No. 171,520, filed July 23, 1980, now abandoned.

Adducts from amines and mono- and diepoxides have long been used in industry as curing agents for epoxy resins. The advantages of the formation of such adducts include lower volatility, lower irritation potential, reduced tendency to blush and exude, and the like. Such adducts and the advantages thereof are discussed in Lee and Neville, Handbook of Epoxy Resins, McGraw Hill (1967). It is to be noted, however, that these adducts do not exhibit significant improvement in chemical resistance over that of their free amine counterparts.

More specifically, such adducts have been prepared from diethylenetriamine with diglycidylethers of bisphenol A of varying molecular weight. These epoxy resins have all exhibited a functionality of not more than two and have exhibited various improved performance characteristics. As previously noted, however, they have been deficient in the important characteristic of resistance to chemical attack, and primarily to solvent attack.

For example, U.S. Pat. Nos. 3,655,624, 3,704,281 and 3,996,186 disclose adducts of triglycidyl isocyanurate and amines. These adducts are solid in form, are noted for use in molding materials and are generally inferior in terms of solvent resistance. Thus, these materials would have limited value as protective coatings.

Additionally, U.S. Pat. Nos. 3,538,184, 3,625,918 and 3,629,181 disclose amine adducts which are based on epoxy resins of the bisphenol A type or are alicyclic epoxy resins. While such adducts exhibit improved handling and mechanical properties, it is to be noted that the resins used therein have a functionality of not more than two and that the adducts are again deficient in the important characteristic of resistance to chemical attack.

It is the primary object of this invention to prepare novel liquid adducts of amines and di- and polyepoxides.

It is a further object to provide adducts for use as curing agents for epoxy resins.

It is still a further object to provide such curing agents which overcome the disadvantages of prior art curing agents when said curing agents are combined with a wide variety of epoxy resins.

Further objects and advantages of this invention will become apparent from the following descriptive material and illustrative examples.

It has now been surprisingly discovered that the preparation of amine adduct curing agents utilizing epoxides of functionality greater than two dramatically enhances the chemical resistance properties of the cured epoxy products, particularly with regard to solvent resistance, over results obtained from either free amines or the conventional amine adducts. The improved performance characteristics are believed to result from the extremely dense cross-link network obtained with the use of such polyepoxides. Thus, when the liquid amine adducts are utilized as curing agents with a wide variety of epoxy resins, the resulting cured products exhibit excellent resistance to attack by a wide variety of solvents, thereby assuring the applicability of these cures systems as, for example, protective coatings.

As suitable amines (component A), there may be mentioned aliphatic, cycloaliphatic or aromatic primary and secondary amines, with the aliphatic and cycloaliphatic amines being preferred. Typical amines include monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3,bis(4-amino-3-methyl-cyclohexyl)methane, bis(p-aminocyclohexyl) methane, 2,2-bis (4-aminocyclohexyl)propane, 3,5,5-trimethyl-s-(aminomethyl)-cyclohexylamine, N-aminoethyl-piperazine, m-phenylene-diamine, p-phenylenediamine, bis(p-aminophenyl)methane, bis(p-aminophenyl)-sulfone, m-xylylenediamine, 1,2-diaminocyclohexane, 1,4-diaminocyclohexane, 1,3-bis(aminomethyl)cyclohexane, 1-4-bis (aminomethyl) cyclohexane and isophorone diamine.

Preferred amines include diethylenetriamine, triethylenetetramine, tetraethylenepentamine, 1,2-diaminocyclohexane, bis (p-aminocyclohexyl)methane, m-xylylenediamine, isophorone diamine, 1,4-bis(aminomethyl)cyclohexane, N-aminoethyl-piperazine, 1,3-bis-(aminomethyl) cyclohexane and bis(p-aminophenyl) methane.

The multifunctional resin of functionality greater than two may be selected from either, Component B

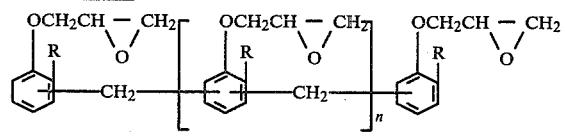

wherein R is hydrogen or methyl, and n is 0.2–3.4. These components are exemplified by the epoxidation products of cresol novolacs and phenol novolacs of varying molecular weight. The preparation of such materials is well known in the art.

Component C—The glycidyl reaction products of excess amounts of epichlorohydrin with polyfunctional phenolic compounds. Typical compounds falling within this category include triglycidylparaaminophenol, tetraglycidyl-1,1,2,2-tetrakis(p-hydroxyphenyl) ethane and triglycidyl ether of phloroglucinol.

Although components B and C may be utilized as the sole polyepoxide reactant, they may also be blended with a diglycidyl ether of bisphenol A (Component D) or a diglycidyl ether of hydrogenated bisphenol A (the diglycidyl ether of 2,2-bis[4-cyclohexanol]propane) (Component E) or mixtures thereof to form the epoxy resin component. Ethers such as component D correspond to the formula

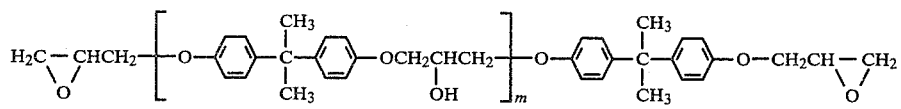

wherein m is 0–2.2, while ethers such as component E correspond to the formula

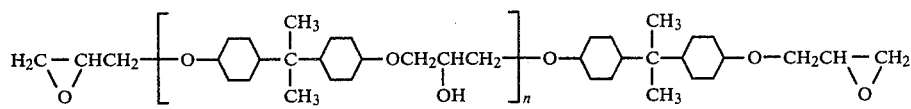

wherein n is 0–2.2.

In addition to the above noted components, accelerators and solvents may be optionally present. The accelerators function to speed the curing operation in the preparation of thin films, i.e. films of a maximum of 8 mil thickness per coat. Typical accelerators include aromatic acids such as benzoic and salicylic acids; phenols such as phenol, p-tert.butyl phenol, bisphenol A and nonyl phenol; and aromatic alcohols such as benzyl alcohol.

The solvents modify the curable blends, particularly serving to control viscosity. Applicable solvents include ether alcohols such as ethylene glycol monomethylether, mono-ethylether, monobutylether, and the diethylene glycol analogs; aromatic hydrocarbons such as xylene and toluene; and the like.

The new adducts of this invention are generally prepared by charging the amine, and the solvent and accelerator if present, to the reaction vessel and heating to a temperature of 50°–80° C. The polyepoxide is then added over a period of from 60 to 180 minutes, allowing a maximum exotherm up to about 125° C. At the conclusion of the polyepoxide feed, the reaction mixture is generally heated to 50° to 120° C. to ensure completeness of the reaction. The progress of the reaction can be followed by titration of the epoxide groups using samples taken during the reaction, completion being indicated by the absence of epoxy groups.

With regard to relative concentrations of the various components, the following tabulated figures apply. In all instances, the amine is used in excess amounts.

(1) Two component reaction products: Component A is utilized in amounts ranging from about 6–20 weight equivalents of A per weight equivalent of component B or component C, and preferably 8–12 equivalents of A per equivalent of B or C.

(2) Three component reaction products: Component B or component C is utilized in amounts ranging from about 1–3 weight equivalents per weight equivalent of component D and/or E, and preferably 1 equivalent of B or C per equivalent of D and/or E. The ratio of A to the epoxy mixture (B-D/E or C-D/E) ranges from 6–20 weight equivalents of A per weight equivalent of mixture, and preferably 8–12 weight equivalents of A per weight equivalent of mixture.

The accelerator and solvent may each be present in concentrations ranging from about 0–40% by weight of the total reaction product.

The adducts of the instant invention are liquids at room temperature with medium viscosity. They are yellow in color.

As previously noted, the adducts of this invention are useful as curing agents for a wide variety of epoxy resins in both room temperature and heat cured applications. When combined with di- and polyepoxides, at generally stoichiometric amounts, and cured at room temperature or with mild heat (about 65° C.), a network of high crosslink density occurs. Accordingly, the expression "cure" as used herein, denotes the conversion of the above adducts and epoxide material into insoluble and infusible cross-linked products, with simultaneous shaping to give shaped articles such as castings, pressings or laminates, or to give two-dimensional structures such as coatings, enamels or adhesive bonds.

The adducts prepared according to the invention and admixed with other polyepoxide compounds can furthermore be mixed, at any stage before cure, with usual modifiers such as extenders, fillers and reinforcing agents, pigments, dyestuffs, organic solvents, plasticizers and the like. As extenders, reinforcing agents, fillers and pigments which can be employed in the curable mixtures according to the invention there may, for example, be mentioned: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("Aerosil"), lithopone, barite, titanium dioxide, carbon black, graphite, iron oxide, or metal powders such as aluminum powder or iron powder. It is also possible to add other usual additives, for example, flameproofing agents, agents for conferring thixotropy, flow control agents such as silicones, cellulose acetate butyrate, polyvinyl butyral, waxes, stearates and the like (which are in part also used as mold release agents) to the curable mixtures.

The curable mixtures can be manufactured in the usual manner with the aid of known mixing equipment (stirrers, kneaders, rollers and the like).

The curable epoxide resin mixtures are especially useful in the fields of surface protection, the electrical industry, laminating processes and the building industry. They can be used in a formulation which is in each case suited to the particular end use, in the unfilled or filled state, optionally in the form of solutions or emulsions, as paints, enamels, sintering powders, compression molding compositions, dipping resins, casting resins, injection molding formulations, impregnating resins and adhesives, as tooling resins, laminating resins, sealing and filling compositions, floor covering compositions and binders for mineral aggregates.

Of primary interest is their utility as protective coatings. The coating composition may be applied to any suitable substrate by any suitable means such as spraying, dipping, brushing, painting or roller coating. After the desired film thickness is applied, curing proceeds either at room temperature or at elevated temperatures. The resultant cured coatings are void-free and possess excellent physical properties and chemical resistance. The distinct advantage of these systems is exhibited in the latter area where excellent resistance to the adverse effects of acids, solvents, alcohols and alkaline materials are noted. Of particular value is the unexpected resistance of these materials to the adverse effects of solvents. Such resistance is essential when the epoxy coatings are utilized as tank linings or flooring materials.

The following examples will further illustrate the embodiments of the instant invention. In these examples, all parts are given by weight unless otherwise noted.

EXAMPLE 1

A three-neck round bottom flask equipped with a mechanical stirrer, thermometer, nitrogen inlet tube and dropping funnel was charged with 49.3 g (2.4 eq.) of diethylenetriamine (DETA). The flask contents were stirred and heated under a nitrogen blanket to 70° C. whereupon 23.7 g (0.12 eq.) of diepoxide resin, diglycidylether of bisphenol A (ARALDITE 6010 from CIBA-GEIGY Corp.) were added portionwise to the reaction mixture. After the resin addition was completed, the temperature was raised to 120° C. Bisphenol A, (27 g) was added at 120° C. and the mixture was held at that temperature for one hour. The amine adduct was characterized by a Gardner-Holdt viscosity at 25° C. of $Z_2$-$Z_3$, a Gardner color of 2, and an $H^+$ equivalent of 38. The above control was designated composition A.

EXAMPLE 2

This example illustrates the preparation of a typical polyamine adduct of this invention.

A three-neck round bottom flask equipped with a mechanical stirrer, thermometer, nitrogen inlet tube and dropping funnel was charged with 164.8 g (8 eq.) of DETA. The flask contents were stirred and heated under a nitrogen blanket to 70° C. whereupon 79 g (0.5 eq.) of polyepoxide resin, epoxy phenol novolac resin of functionality of 3.6 (EPN 1138 from CIBA-GEIGY Corp.) 50% in xylene, and 94.3 g (0.5 eq.) of diepoxide resin 6010 were added portionwise to the reaction mixture. After the resin addition was complete, the temperature was raised to 120° C. Bisphenol A (128.7 g) was charged at 120° C. and the mixture was held at that temperature for one hour.

The polyamine adduct was characterized by a Gardner-Holdt viscosity at 25° C. of X-Y, an $H^+$ equivalent of 97 and a solids content of 68.8% after dilution with Cellosolve (132.6 g). The above composition was designated B.

EXAMPLE 3

In a procedure similar to Example 2, a polyamine adduct was prepared substituting 106.3 g (0.5 eq.) of epoxy cresol novolac resin of functionality of 2.7 (ECN 1235 from CIBA-GEIGY Corp.), 50% in xylene, for EPN 1138. This adduct was characterized by a Gardner-Holdt viscosity at 25° C. of X-Y, an $H^+$ equivalent of 105 and a solids content of 67.4% after dilution with Cellosolve (132.6 g). It was designated composition C.

EXAMPLE 4

A three-neck round bottom flask equipped with mechanical stirrer, thermometer, nitrogen inlet tube and dropping funnel was charged with 420 g (15.0 eq.) of 1,2-diaminocyclohexane (DAC) and the flask contents were stirred and heated under a nitrogen blanket to 70° C. The formation of the polyamine adduct was accomplished by feeding 178 g of polyepoxide resin EPN 1138 (1.0 eq.), dissolved in an equal weight of xylene, into the polyamine via a dropping funnel, allowing the exothermic reaction to proceed to a maximum of 125° C. The reaction mixture was then heated at the conclusion of the feed at about 80° C. for 2 hours to complete the reaction.

The polyamine adduct was characterized by a Gardner-Holdt viscosity at 25° C. of B-C, an $H^+$ equivalent of 55 and a solids content of 77.1%. This material was designated composition D.

EXAMPLE 5

Following the procedure used in Example 4, other polyamine adducts were prepared from DAC and EPN 1138 in the following proportions:

| Composition | DAC (g) | EPN (g) | Eq. Ratio | Gardner-Holdt Viscosity (25° C.) | % Wt. Solids | $H^+$ Equivalent |
|---|---|---|---|---|---|---|
| E | 280 | 178 | 10:1 | N-O | 72.0 | 71 |
| F | 224 | 178 | 8:1 | V | 69.3 | 83 |

EXAMPLE 6

Following the procedure used in Example 4, other polyamine adducts were prepared from DAC and ECN 1235 in the following proportions:

| Composition | DAC (g) | ECN (g) | Eq. Ratio | Gardner-Holdt Viscosity (25° C.) | % Wt. Solids | $H^+$ Equivalent |
|---|---|---|---|---|---|---|
| G | 420 | 212.7 | 15:1 | X | 74.8 | 60 |
| H | 280 | 212.7 | 10:1 | J | 69.8 | 78 |
| I | 224 | 212.7 | 8:1 | $Z_5$-$Z_6$ | 67.2 | 93 |
| J | 168 | 212.7 | 6:1 | Y-Z | 64.2 | 119 |

EXAMPLE 7

A polyamine adduct was prepared with 424 g (8.0 eq.) of bis(p-aminocyclohexyl)methane and 178 g (1.0 eq.) of polyepoxide resin EPN 1138 dissolved in an equal weight of xylene using the procedure described in Example 4. The polyamine adduct was characterized by a Gardner-Holdt viscosity at 25° C. of $Z_4$-$Z_5$, an $H^+$ equivalent of 111, and a solids content of 77.2%. This composition was designated K.

EXAMPLE 8

A polyamine adduct was prepared with 318 g (6.0 eq.) of bis(p-aminocyclohexyl)methane and 212.7 g (1.0 eq.) of polyepoxide resin ECN 1235 dissolved in an equal weight of xylene using the procedure described in Example 4. The polyamine adduct was characterized by a Gardner-Holdt viscosity at 25° C. of $Z_2$-$Z_3$, an $H^+$ equivalent of 149, and a solids content of 71.4%. The adduct was designated composition L.

EXAMPLE 9

A three-neck round bottom flask equipped with mechanical stirrer, thermometer, nitrogen inlet tube and dropping funnel was charged with 280 g (10.0 eq.) of DAC and the flask contents were stirred at ambient temperature under a nitrogen blanket. The formation of the polyamine adduct was accomplished by feeding 108.6 g (1.0 eq.) of polyepoxide resin, triglycidyl p-aminophenol [0500 resin from CIBA-GEIGY Corp.], dissolved in 27.15 g of Cellosolve into the polyamine in a dropwise manner from a dropping funnel, allowing the exothermic reaction to proceed to a maximum of 50° C. The reaction mixture was then heated for 2 hours at 50° C. to complete the reaction. Upon cooling, benzyl alcohol (166.3 g) was added.

The polyamine adduct was characterized by a Gardner-Holdt viscosity at 25° C. of M, and $H^+$ equivalent of 65, and a solids content of 66.8%. This adduct was designated composition M.

EXAMPLE 10

A three-neck round bottom flask equipped with mechanical stirrer, thermometer, nitrogen inlet tube and dropping funnel was charged with 280 g (10.0 eq.) of DAC and the flask contents were stirred at ambient temperature under a nitrogen blanket. The formation of the polyamine adduct was accomplished by feeding 108.6 g (1.0 eq.) of 0500 dissolved in 27.15 g of benzyl alcohol into the polyamine in a dropwise manner from a dropping funnel, allowing the exothermic reaction to proceed to a maximum of 50° C. The reaction mixture was then heated for 2 hours at 50° C. to complete the reaction. A Gardner-Holdt viscosity at 25° C. of $Z_2$, an H+ equivalent of 46 and a solids content of 93.4% were obtained. The adduct was designated composition N.

EXAMPLE 11

In a procedure similar to Example 10, the following polyamine adducts were prepared by varying the equivalent ratio of DAC.

| Composition | DAC (g) | 0500 (g) | Eq. Ratio | Gardner-Holdt Viscosity (25° C.) | % Wt. Solids | H+ Equivalent |
|---|---|---|---|---|---|---|
| O | 196 | 108.6 | 7:1 | N-O | 91.8 | 56 |
| P | 168 | 108.6 | 6:1 | T-U | 91.1 | 61 |

EXAMPLE 12

Following the procedures of Examples 10 and 11, additional polyamine adducts were prepared by substituting metaxylylenediamine (MXDA) and isophorone diamine (IPD) for part or all of the DAC.

| Composition | DAC (g) | MXDA (g) | IPD (g) | Eq. Ratio | Gardner-Holdt Viscosity (25° C.) | % Wt. Solids | H+ Equivalent |
|---|---|---|---|---|---|---|---|
| Q | — | 272 | — | 8:1 | $Z_3$ | 93.3 | 58 |
| R | — | 204 | — | 6:1 | $Z_2$-$Z_3$ | 92.0 | 68 |
| S | — | — | 340.8 | 8:1 | $Z_7$ | 94.3 | 68 |
| T | 168 | 136 | — | 10:1 | Z-$Z_1$ | 93.8 | 49 |
| U | 170.4 | — | 168 | 10:1 | $Z_3$-$Z_4$ | 92.6 | 41 |

EXAMPLE 13

A polyamine adduct was prepared according to Example 10 by substituting 195.3 g of polyepoxide, tetraglycidyl-1,1,2,2-tetrakis (p-hydroxylphenyl)ethane (0163 resin from CIBA-GEIGY Corp.) dissolved in 204.7 g of benzyl alcohol and 35.8 g of Cellosolve for 0500. The equivalent ratio was 10:1. The adduct was characterized by a Gardner-Holdt viscosity at 25° C. of $Z_2$-$Z_3$, and H+ equivalent of 80 and solids content of 66.4%. The adduct was designated composition V.

EXAMPLE 14

A three-neck round bottom flask equipped with a mechanical stirrer, thermometer, nitrogen inlet tube and dropping funnel was charged with 228 g (8.0 eq.) of DAC, 194.5 g of benzyl alcohol and 9.8 g of salicylic acid. The flask contents were heated under a nitrogen blanket to 80° C. whereupon 190 g (1.0 eq.) of diepoxide resin 6010 was added portionwise from the dropping funnel, allowing the reaction temperature to reach 90°–95° C. At the completion of the 6010 feed, the reaction mixture was held at 95° C. for 1.5 hours to complete the reaction.

The adduct was characterized by a Gardner-Holdt viscosity at 25° C. of $Z_1$, an H+ equivalent of 89 and a solids content of 68.7%. The above control was designated composition W (control).

EXAMPLE 15

A three-neck round bottom flask equipped with a mechanical stirrer, thermometer, nitrogen inlet tube and dropping funnel was charged with 280 g (10.0 eq.) of DAC, 194.5 g benzyl alcohol, 9.8 g salicyclic acid. The flask contents were heated to 80° C. whereupon 89 g (0.5 eq.) of polyepoxide resin EPN 1138 and 94.3 g (0.5 eq.) of diepoxide resin 6010 were added portionwise to the reaction mixture, allowing a maximum exotherm of 95° C. At the conclusion of the feed, the reactor contents were heated to 95° C. for one and one-half hours to complete the reaction.

The polyamine adduct was characterized by a Gardner-Holdt viscosity at 25° C. of X-Y, an H+ equivalent of 74, and a solids content of 70.9%. The adduct was designated composition X.

EXAMPLE 16

Additional polyamine adducts were prepared as in Example 14 with the following changes:

| Composition | DAC (g) | IPD (g) | EPN (g) | ECN (g) | 6010 (g) | Eq. Ratio | Gardner-Holdt Viscosity (25° C.) | % Wt. Solids | H+ Equivalent |
|---|---|---|---|---|---|---|---|---|---|
| Y | — | 340.8 | 89 | — | 94.3 | 8:1 | $Z_6$-$Z_7$ | 73.3 | 104 |
| Z | 224 | — | — | 106.3 | 94.3 | 8:1 | $Z_3$ | 69.1 | 90 |

EXAMPLE 17

A three-neck round bottom flask equipped with a mechanical stirrer, thermometer, nitrogen inlet tube and dropping funnel was charged with 224 g (8.0 eq.) of DAC. The flask contents were stirred and heated under a nitrogen blanket to 55° C. whereupon 89 g (0.5 eq.) of polyepoxide resin EPN 1138 and 260.4 g (0.5 eq.) of diepoxide resin (ARALDITE 7071 from CIBA-GEIGY Corp.), 50% in xylene, were added dropwise to the reaction mixture, allowing the exothermic reaction to proceed to a maximum of 80° C. At the conclusion of the feed, the reactor contents were held without external heat until the exotherm subsided.

The polyamine adduct exhibited a Gardner-Holdt viscosity at 25° C. of Y, an H+ equivalent of 119 and a solids content of 68.8%. The adduct was designated composition AA.

EXAMPLE 18

The following adducts were prepared according to Example 16 with the changes indicated below:

| Composition | DAC (g) | ECN (g) | EPN (g) | 6010 (g) | 7071 (g) | Eq. Ratio | Gardner-Holdt Viscosity (25° C.) | % Wt. Solids | H+ Equivalent |
|---|---|---|---|---|---|---|---|---|---|
| BB | 224 | 106.3 | — | — | 260.4 | 8:1 | Y | 69.4 | 122 |
| CC | 224 | 106.3 | — | 94.3 | — | 8:1 | Y-Z | 79.9 | 76 |
| DD | 224 | — | 89 | 94.3 | — | 8:1 | $Z-Z_1$ | 82.1 | 71 |

EXAMPLE 19

A polyamine adduct was prepared with 355.6 g (10 eq.) of 1,4-bis(aminomethyl)cyclohexane and 175.4 g (1.0 eq.) of polyepoxide resin of functionality 2.2 (EPN 1139 from CIBA-GEIGY Corp.) dissolved in 87.7 g of xylene using the procedure described in Example 4. The polyamine adduct was characterized by an $H^+$ equivalent of 69, and a solids content of 85.8%. The adduct was designated composition EE.

EXAMPLE 20

A polyamine adduct was prepared with 280 g (10.0 eq.) of DAC, 106.3 g (0.5 eq.) of ECN 1235, dissolved in 45.5 g of xylene, and 113.5 g (0.5 eq.) of the diglycidyl ether of 2,2-bis(4-cyclohexanol)propane (EEW≃227) according to the procedure used in Example 17. The polyamine adduct was characterized by an $H^+$ equivalent of 61 and a solids content of 91.7%. The adduct was designated composition FF.

EXAMPLE 21

A three-neck round bottom flask equipped with a mechanical stirrer, reflux condenser, thermometer, nitrogen inlet tube and dropping funnel was charged with 451 g of benzyl alcohol, 594.0 g (12.0 eq.) of bis(p-aminophenyl)methane (HT 972 from CIBA-GEIGY Corporation) and 21.3 g of salicylic acid with stirring. The flask contents were heated under a nitrogen blanket to 80° C. for one-half hour whereupon 106.3 g (0.5 eq.) of ECN 1235 and 94.3 g (0.5 eq.) of diepoxide resin 6010 were added portionwise, allowing a maximum exotherm of 90° C. At the conclusion of the feed, the reaction contents were heated to 100° C. for one-half hour to complete the reaction.

The polyamine adduct, designated composition GG, was characterized by a Gardner color of 9, an $H^+$ equivalent of 115 and a solids content of 64.4%.

APPLICATION AND TESTING

Chemical resistance testing was conducted according to CIBA-GEIGY Test Method No. 230, said procedure being based on ASTM methods D 1308-57 and D 1540-61. The "Chemical Tester Procedure" was followed using glass test cells. All test panels were prepared at a film thickness of 12-16 mils on sandblasted, hot rolled steel substrate. All films were clear and unfilled. The testing was conducted at 23° C.

In order to demonstrate the superiority of the products of this invention, extremely aggressive reagents were chosen for chemical testing. These reagents included HCl (36%), acetic acid (10%), ammonium hydroxide (30%), Cellosolve, acetone, methyl ethylene ketone, butyl acetate, methylene chloride, trichloroethylene, ethanol (95%), and methanol. Failure was defined as the appearance of blisters, delamination, softening to substrate or total destruction of the coating.

EXAMPLE 22

| CHEMICAL RESISTANCE COMPARISON* | | |
|---|---|---|
| Hardener Adduct | A | C |
| (parts per 100 parts of resin)** | 20 | 56 |
| | (days to failure) | |
| HCl (36%) | >14 | >14 |
| Acetic Acid (10%) | >14 | >14 |
| NH4OH (30%) | >14 | >14 |
| Cellosolve | <3 | >14 |
| Acetone | <3 | <3 |
| MEK | <3 | >14 |
| Butyl Acetate | 5 | >14 |
| Methylene Chloride | <3 | <3 |
| Trichloroethylene | <3 | >14 |
| Ethanol (95%) | <3 | >14 |
| Methanol | <3 | 10 |

*Cure Conditions: 10 days at 23° C. before immersion.
**ARALDITE 6010 was used throughout as the resin component.

EXAMPLE 23

| CHEMICAL RESISTANCE COMPARISON* | | | |
|---|---|---|---|
| Hardener Adduct | W | X | Z |
| phr** | 47 | 39 | 48 |
| | (days to failure) | | |
| HCl (36%) | >14 | >14 | >14 |
| Acetic Acid (10%) | >14 | >14 | >14 |
| NH4OH (30%) | >14 | >14 | >14 |
| Cellosolve | <3 | >14 | >14 |
| Acetone | <3 | 7 | >14 |
| MEK | <3 | 7 | 7 |
| Butyl Acetate | >14 | >14 | >14 |
| Methylene Chloride | <3 | <3 | <3 |
| Trichloroethylene | 7 | >14 | >14 |
| Ethanol (95%) | >14 | >14 | >14 |
| Methanol | <3 | >14 | >14 |

*Cure Conditions: 10 days at 23° C. before immersion.
**Parts per 100 parts of resin. ARALDITE 6010 was used throughout as the resin component.

EXAMPLE 24

| CHEMICAL RESISTANCE COMPARISON* | | |
|---|---|---|
| Hardener Adduct | DETA (control) | M |
| phr** | 11 | 35 |
| | (days to failure) | |
| HCl (36%) | 89 | 21 |
| Acetic Acid (10%) | 63 | 6 |
| NH4OH (30%) | 138 | >180 |
| Cellosolve | <3 | >180 |
| Acetone | <3 | >180 |
| MEK | <3 | >180 |
| Butyl Acetate | >180 | >180 |
| Methylene Chloride | <3 | <3 |
| Trichloroethylene | >180 | 87 |
| Ethanol (95%) | <3 | >180 |

-continued

| CHEMICAL RESISTANCE COMPARISON* | | |
|---|---|---|
| Methanol | <3 | >180 |

*Cure Conditions: 10 days at 23° C. before immersion.
**Parts per 100 parts of resin. ARALDITE 6010 was used throughout as the resin component.

EXAMPLE 25

| CHEMICAL RESISTANCE COMPARISON* | | |
|---|---|---|
| Hardener Adduct | DETA (control) | M |
| phr** | 11 | 35 |
| | (days to failure) | |
| HCl (36%) | 90 | 28 |
| Acetic Acid (10%) | 150 | 53 |
| NH4OH (30%) | >180 | >180 |
| Cellosolve | 60 | >180 |
| Acetone | 7 | >180 |
| MEK | <3 | 65 |
| Butyl Acetate | >180 | >180 |
| Methylene Chloride | <3 | <3 |
| Trichloroethylene | >180 | 163 |
| Ethanol (95%) | >180 | >180 |
| Methanol | 90 | >180 |

*Cure Conditions: 10 hours at 65° C. before immersion.
**Parts per 100 parts of resin. ARALDITE 6010 was used throughout as the resin component.

EXAMPLE 26

| CHEMICAL RESISTANCE COMPARISON* | | | | |
|---|---|---|---|---|
| Hardener Adduct | A (control) | P | S | T |
| phr** | 20 | 32 | 36' | 26 |
| | (days to failure) | | | |
| HCl (36%) | >47 | 15 | >47 | 21 |
| Acetic Acid (10%) | >47 | <3 | 14 | 21 |
| NH4OH (30%) | >47 | >47 | >47 | >47 |
| Cellosolve | 7 | >47 | >47 | >47 |
| Acetone | <2 | >47 | >47 | >47 |
| MEK | <2 | >47 | >47 | >47 |
| Butyl Acetate | 20 | >47 | >47 | >47 |
| Methylene Chloride | <3 | <3 | >47 | 28 |
| Trichloroethylene | <2 | >47 | >47 | >47 |
| Ethanol (95%) | 9 | >47 | >47 | >47 |
| Methanol | <2 | >47 | >47 | 21 |

*Cure Conditions: 10 hours at 65° C. before immersion.
**Parts per 100 parts of resin. ARALDITE 6010 was used throughout as the resin component.

Summarizing, it is seen that this invention provides novel polyamine adducts which exhibit excellent properties as curing agents. Variations may be made in proportions, procedures and materials without departing from the scope of the invention as defined by the following claims.

What is claimed is:

1. A curing agent for epoxy resins comprising the adduct, free of epoxy groups, obtained from the reaction of
   (a) an amine;
   (b) a polyepoxide resin having a functionality greater than two and being either (i) the epoxidation product of cresol novolac resins corresponding to the formula

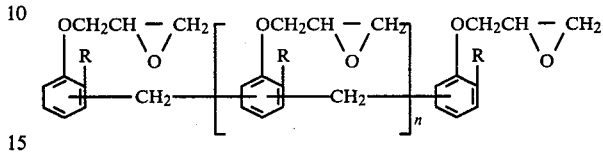

wherein R is $CH_3$ and n is 0.2–3.4, or
   (ii) triglycidyl p-aminophenol; and, optionally, an accelerator for said curing operation and a solvent for said curing agent; said amine being present in excess relative to said polyepoxide resin.

2. The adduct of claim 1, wherein said polyepoxide resin comprises a blend of either component (i) or component (ii) with a diglycidyl ether of bisphenol A corresponding to the formula

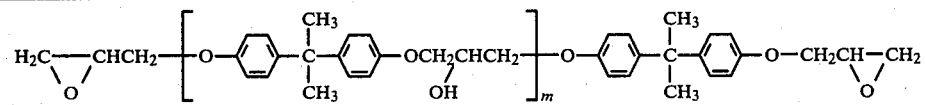

wherein m is 0–2.2, a diglycidyl ether of hydrogenated bisphenol A corresponding to the formula

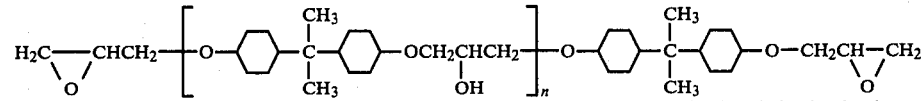

wherein n is 0–2.2 or mixtures of said diglycidyl ethers.

3. The adduct of claims 1 or 2, wherein said amine is an aliphatic or cycloaliphatic amine.

4. The adduct of claim 3, where said amine is selected from the group consisting of diethylenetriamine, triethylenetetramine, tetraethylenepentamine, 1,2-diaminocyclohexane, bis(p-aminocyclohexyl)-methane, m-xylylenediamine, isophorone diamine, 1,4-bis(aminomethyl)cyclohexane, N-aminoethyl-piperazine 1,3-bis-(aminomethyl)-cyclohexane and bis(p-aminophenyl) methane.

5. The adduct of claim 1, wherein said amine is present in a concentration ranging from about 6–20 weight equivalents per weight equivalent of said polyepoxide resin.

6. The adduct of claim 2, wherein in said blend said component (i) or component (ii) is present in a concentration ranging from about 1–3 weight equivalents per weight equivalent of said diglycidyl ether.

7. The adduct of claims 2 or 6, wherein said amine is present in a concentration ranging from about 6–20 weight equivalents per weight equivalent of said blend.

8. The adduct of claims 1 or 2, wherein said accelerator is present in a concentration of from 0–40% by weight of said adduct and is selected from the group consisting of aromatic acids, phenols and aromatic alcohols.

9. The adduct of claims 1 or 2 wherein said solvent is present in a concentration of from 0–40% by weight of said adduct and is selected from the group consisting of ether alcohols and aromatic hydrocarbons.

10. A curable mixture comprising (a) a polyepoxide compound and (b) an adduct according to claims 1 or 2.

* * * * *